United States Patent [19]

Stoll

[11] 4,171,665
[45] Oct. 23, 1979

[54] PISTON, ESPECIALLY FOR A PNEUMATIC CYLINDER

[76] Inventor: Kurt Stoll, Lenzhalde 72, Esslingen am Neckar, Fed. Rep. of Germany

[21] Appl. No.: 814,700

[22] Filed: Jul. 11, 1977

[30] Foreign Application Priority Data

Jul. 13, 1976 [DE] Fed. Rep. of Germany ....... 2609817

[51] Int. Cl.² .......................... F01B 31/10; F16J 9/00; F16J 1/08
[52] U.S. Cl. ....................................... 92/159; 92/160; 92/250; 92/257; 91/395
[58] Field of Search .................... 92/160, 159; 91/395, 91/394

[56] References Cited

U.S. PATENT DOCUMENTS

| 316,492 | 4/1885 | Simpson et al. | 92/159 |
| 2,079,977 | 5/1937 | Wenzel | 92/160 |
| 2,201,571 | 5/1940 | Aikman | 92/159 |
| 2,911,952 | 11/1959 | Peras | 91/394 |

FOREIGN PATENT DOCUMENTS 1254973 11/1967 Fed. Rep. of Germany ............ 91/394

Primary Examiner—Paul E. Maslousky
Attorney, Agent, or Firm—Watson, Cole, Grindle & Watson

[57] ABSTRACT

A piston, especially for a pneumatic cylinder, includes a disc-shaped piston head and a sealing element on the head, such element has at least one annular sealing lip extending outwardly of the peripheral sliding surface of the head, the sealing lip being of elastic and resilient material and being of conical form relative to a central axis of the piston head, an outer free edge of the lip thereby being capable of sealingly engaging the wall of the cylinder.

7 Claims, 8 Drawing Figures

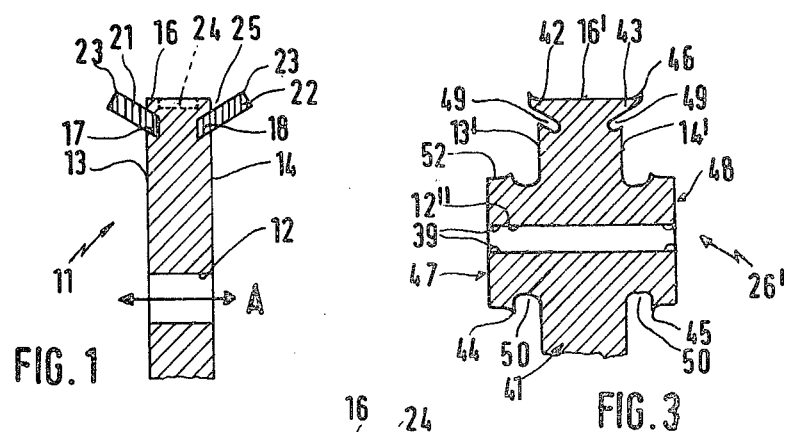
FIG. 1
FIG. 3
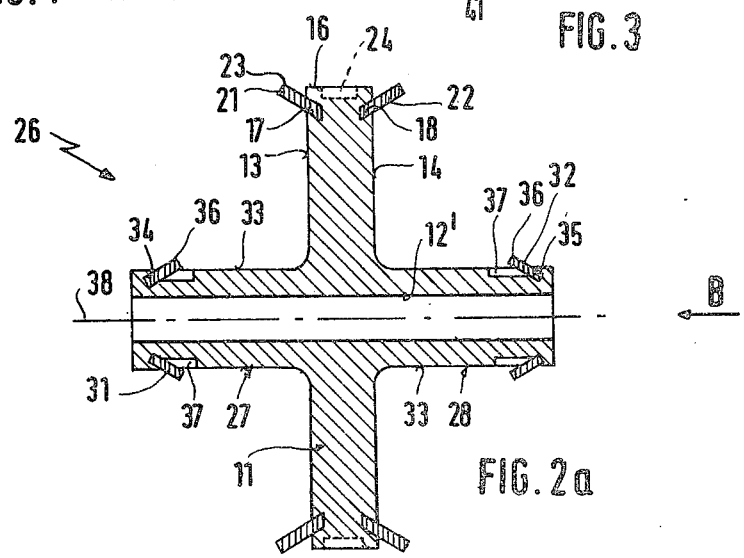
FIG. 2a
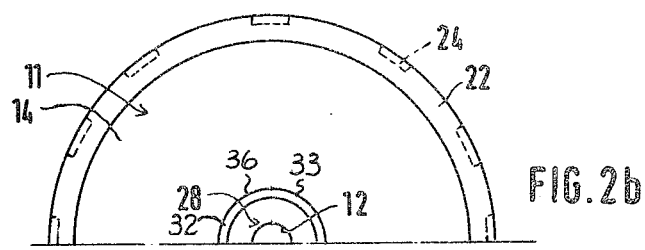
FIG. 2b

PISTON, ESPECIALLY FOR A PNEUMATIC CYLINDER

This invention relates to a piston, especially a piston for pneumatic cylinders, which comprises at its circumference a radially acting sealing element.

It is an object of the present invention to provide a piston of the nature outlined above which, though having the same service life like known pistons, and is simple in its layout, is characterized by very little friction and consequently enables operation to be essentially lubrication-free.

For this purpose the piston according to the invention comprises a slidable plastic material which has the necessary strength, and the sealing element extending around the circumference comprises at least one resilient, elastic lip of plastic material and extending for example in a conical manner. This arrangement allows the piston to function as an elastic gasket capable of adjusting itself automatically to changes in pressure and wear and, moreover, of covers substantial cylinder tolerances. Also, the sealing element is entirely of plastic material, is of light weight, and consequently causes the damping operation the stroke end to be very moderate. The large control area, combined with the use of a slidable material and the special design of the sealing element results in a considerable reduction of friction so that a lubrication-free operation is feasible in given cases. Despite all this, the sealing function is still very great; this may be deduced from the very moderate leakage. The manufacture of the piston is simple because the grooves are already formed in the piston body. The principle of the invention is applicable to all types of pistons, for example pistons used with pneumatic cylinders to which pressure is admitted from one side only or from either side as well as for those units which have a dampening piston on one or either side.

With a preferable embodiment of the invention the sealing lip is an integral part of a guide ring which is accommodated in circumferential grooves on the two piston halves and may for example be provided with two sealing lips which extend at a given angle from the sides. When this possibility is utilised, the sealing element may simply be clamped between the two piston halves. The manner of assembling is indeed extremely simple. It is an additional advantage of the sealing element that the latter not only be provided with one or two sealing lips but that it also control the movement of sliding along the inner wall surface of the cylinder. The only function that is left for the piston halves as such is that of a carrying element. It is therefore essentially a question of chosing a material which has the necessary compressive strength, when deciding on the manufacture of the piston, and to ensure that the halves sustain the pressure admitted during service conditions. Piston cylinder units to which pressure is admitted from either side normally comprise sealing elements with two lips. It is considered an advantage that the sealing elements, contrary to those used with the basic embodiment of the parent patent, comprise a single, integral part, because the sealing element or rather its guide ring may be secured in position between the piston halves by means of a positive connection as, for example, a dove-tail joint which automatically ensures that the guide ring is located truly centrally in the assembled unit. The two piston halves may for example be assembled with the aid of Seeger rings which are let into the piston rod at positions adjacent to the piston ends, or one or several axially parallel lock screws might be used. This latter measure ensures at the same time that the guide ring is clamped firmly between the piston halves, while the first method ensures that the piston cannot be axially displaced along the piston rod; this can only be achieved in the second case when using a groove stop which engages with a recess in the piston rod and is clamped between the piston halves during the assembly. Whatever the design there may be one or several recesses or channels between the two piston halves, which may serve for the accommodation of a lubricant. In an embodiment of the present invention, in which the recess is provided for the accommodation of the lubricant, it is possible for spring elements which are preferably plate springs to be located in such recess, their purpose being to ensure that a given distance is maintained between the two piston halves by the spring pretension so that a slot is formed through which the lubricant may reach the sliding area of the guide ring. This spring-like axial mounting of the piston, complementing the structural features of the plate springs, makes the two piston halves move towards one another when responding to the force of compression, so that, in consequence of the reduction of the lubricant cavity, the effect of a pump is initiated through which part of the lubricant is automatically directed towards the guide ring. The lubricant cavity may, for example be compressed each time when operating medium is admitted to one of the piston halves, that is to say, with the beginning of each consecutive stroke, the other piston half-reacting to the plate springs - being directed into the corresponding working position.

Further details and embodiments of the invention are set forth in the following specification, reference being made to the accompanying drawing of a number of preferred embodiments of the invention.

In particular,

FIG. 1 is a section taken through part of a piston for a pneumatic cylinder according to the first embodiment of the present invention;

FIG. 2a is a section taken through a piston comprising a main piston and a damping piston according to a second embodiment of the invention;

FIG. 2b is a partial end view of the FIG. 2a piston taken along arrow B thereof;

FIG. 3 is a section taken through a piston according to a third embodiment of the invention;

Figure 4:
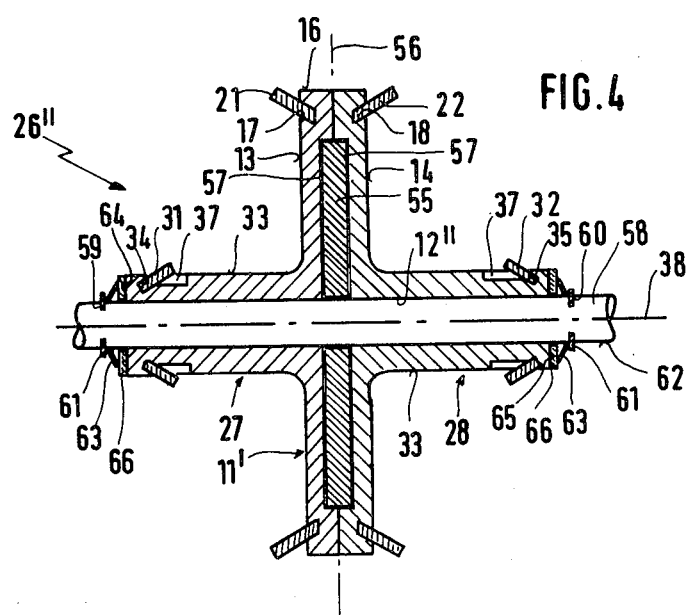
FIG. 4 is a section taken through a piston including the piston rod, according to a fourth embodiment of the invention.

FIG. 1 shows only part of a piston 11 in section. It comprises a central bore 12 to accommodate a piston rod (not shown), and constitutes the main piston of a pneumatic unit which reciprocates inside a corresponding cylinder to which compressed air may be admitted from either side. The basic shape of piston 11 is the conventional disc shape made of synthetic material with good sliding properties, and is capable of absorbing, without being unduly deformed, the compressive loads applied for example by the pressure medium. The preferred material is fibreglass reinforced polyurethane. The piston 11 has an annular groove 17 and 18 respectively in its two annular surfaces 13 and 14 which extend at right angles to the reciprocating movement shown by the double arrow A, the grooves being located in the vicinity of the sliding areas on piston end face 16. Annular grooves 17, 18 form, together with annular surfaces 13 and 14, respectively, acute angles in such a manner that the open ends thereof face the inner wall of the cylinder, while the bases thereof are parallel to the associated annular end wall surfaces 14 and 13. The inclined annular grooves 17,18 support gaskets 21,22, respectively, together defining a conical section. The free ends of the gaskets lie perpendicular to the sidewalls thereof, and are sufficiently wide so that free outer edges 23 thereof extend beyond sliding area 16 of the piston. Gaskets 21, 22 are identical, are made of a synthetic material, preferably polyurethane, and are therefore sufficiently resilient and pliable to form a seal at the inner cylinder wall so as to preferably withstand compressed air. The gaskets are therefore designed as lips which act as elastic springs during actuation of the piston. As shown, sealing lips 21, 22 are press fitted into annular grooves 17, 18 of the piston. However, since piston 11 and sealing rings 21, 22 are essentially made of the same plastic material, it is also feasible to ultrasonically weld the gasket lips into the annular grooves or to roll them into position.

Piston 11 thus includes a wide guiding area in the form of its sliding face 16, and a low-friction sealing element in the form of annular gasket lips 21, 22. Moreover, piston 11 including its sealing elements has a small volume and low weight, so that the damping function produced at the stroke-end is therefore reduced to a minimum. A wide selection of material is available from which piston 11 may be made, and it is not absolutely necessary that lubrication be provided for working the piston. However, as shown in dashed outline the piston may be provided with grease-pockets 24 equally spaced in face 16. These grease pockets therefore provide for the lubrication of the approximately triangular cavities 25 between the wider outer edge of annular seals 21, 22 at the inner cylinder wall (not shown), and the adjacent regions of annular surfaces 13, 14 of piston 11.

A piston 26 shown in FIG. 2 essentially comprises a main piston 11 corresponding to the FIG. 1 piston, and damper pistons 27, 28 formed integrally with main piston 11 and extending outwardly of opposite sides thereof. The two damper pistons 27, 28, being identical shape and both made of fibreglass reinforced polyurethane similarly as the main piston 11, therefore form a single unit in the main piston both centrally and axially. And, piston 26 is provided with a central bore 12' for the accommodation of piston rod (not shown). As in main piston 11, damper pistons 27, 28 are provided with annular sealing lips 31, 32 located at the respective free ends of the pistons, each lip being essentially rectangular in cross-section and extending conically relative to the piston free ends. Sealing lips 31, 32, of polyurethane and therefore resilient and pliable, are seated elastically in annular grooves 34, 35 which are included toward piston axis 38. And, the free ends of the sealing lips face annular surfaces 13 and 14, respectively, of main piston 11. The width of sealing lip 31, 32 which may, for example, be press fitted into their grooves, or welded therein, is such that sealing edges 36 thereof project slightly beyond sliding surfaces 33. Annular recesses 37 extend from annular grooves 34,35 respectively towards surfaces 13,14. The base of each recess 37 is parallel to piston axis 38 and the depth thereof is less than that of inclined annular grooves 34,35 while the width and depth of each recess is approximately equal to the width and thickness of each sealing lip.

With such arrangement, sealing lips 31, 32 bear elastically, at the edges 36 thereof, against the inner wall surface of the damping element of the cylinder, regardless of the operational direction in which the sealing lips are expected to act, the lips moving to a certain extent into annular recesses 37 during piston movement.

A piston 26', shown in FIG. 3, includes a main piston 41 and two centrally disposed damper pistons 47, 48 extending axially of and outwardly from annular surfaces 13',14' of the main piston. These damper pistons may be formed integrally with the main piston or may be molded thereon. Piston 26' is provided with an axial, central, continuous bore 12" and, if desired, internal seals 39 for the piston rod, and is made of a plastic material having the required strength and sliding properties, as a fibre reinforced polyurethane. Main piston 41 is provided with integral annular sealing lips 42 and 43, and pistons 47,48 are provided with integral annular sealing lips 44, all of a non-reinforced polyurethane. The blade-like edges 46 of sealing lips 42 and 43 project beyond sliding surface 16', and are each provided with a back taper or an undercut 49 which, similarly as the annular grooves of the aforedescribed embodiments, are inclined inwardly toward the piston axis, and consequently enable the sealing lips 42, 43 to act elastically or springly. In a similar manner sealing lips 44, 45 of damper pistons 47, 48 are provided with annular back tapers or undercuts 50 which are dish-shaped in cross-section. Also, sealing lips 44, 45 have blade-like sealing edges which extend beyond sliding surfaces 52 of damper pistons 47, 48, and may be forced partially into back taper 50. Arm piston 11, main piston 41 may be provided with grease pockets in its circumferential surface 16'.

Piston 26" shown in FIG. 4 comprise a main piston 11' which is sectioned along its longitudinal median plane 56, and is provided, on either side, with integrally formed damper pistons 27', 28'. Each section of main piston 11' is provided with an annular recess 57 of a diameter equal to approximately ⅝ to ¾ the diameter of the main piston. The depth of the recess in each section is approximately equal to half the thickness of a disc 55 of steel sheeting seated in the recesses for increasing the bending resistance of main piston 11' when extremely high loads are applied. The main piston is provided with sealing lips 21,22 similarly arranged and functioning for the same purpose as the sealing lips described for main piston 11 according to FIG. 2. Also, damper pistons 27',28' having sealing lips 31,32 and grooves 37 similarly arranged and for the same purpose as that described for FIG. 2.

Unlike conventional systems, the piston 26" is not threadedly secured through piston rod 58. Instead, piston rod 58 is provided with two annular groove 59, 60 spaced a predetermined distance apart for the reception of Seeger rings 61. Piston 26" is elastically fixed between the two Seeger rings 61 which project outwardly of periphery 62 of piston rod 58. The piston is firmly held in place by means of plate springs 63 bearing against rings 61 at the inner edges of the springs. The outer edges of springs 63 bear against metallic bearing rings 66 which rest against end faces 64,65 of damper pistons 26', 28'. The plate springs are preferably slightly pretensioned. It should be noted that a piston 11' without damper pistons may be similarly held in place in rod 58, and that more than one plate spring may be provided at each end of the damper pistons. This fixing technique may also be used for pistons 11, 26, 26', shown in FIGS. 1 to 3.

It is also obvious that pistons 26, 26' and 26" may each be provided with only one damper piston. And, in each of the aforedescribed embodiment of the invention, the compressed air admitted into the system for effecting piston movement forces sealing lips 21, 22 or 42, 43 of the main piston 11 or 41 respectively, towards the inner cylinder wall. This produces an excellent sealing effect, and reduces leakage possibilities.

Figure 5:
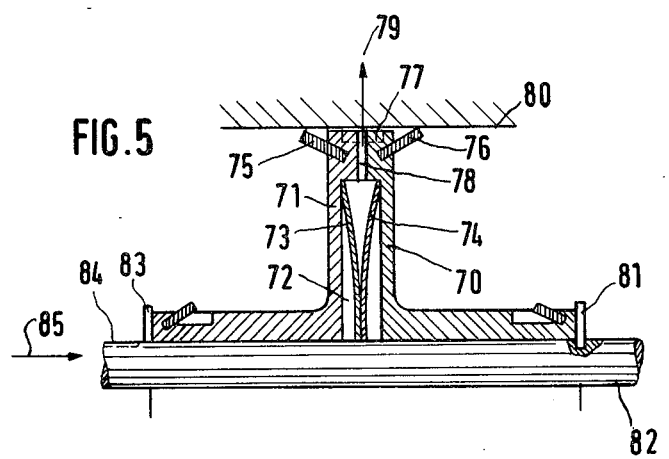
FIG. 5 is a section taken through a piston including a shaft, according to a fifth embodiment of the invention.

A further variant of the invention, shown in FIG. 5, includes main and damper pistons formed as two piston halves 70 and 71 having a cavity 72 accommodating elastic elements such as two plate springs 73, 74. The piston halves again comprise rolled-in polyurethane sealing rings 75, 76, and have at their circumference lubricating pockets 77. The cavity 72 may contain a lubricant which may communicate with sliding surface 80 of the cylinder through a duct 78, as indicated by arrow 79. When assembling the unit, Seeger ring 81 is mounted on shaft 82, followed by pushing piston half 70 over it, after which plate springs 73, 74, and inserted over the shaft and finally the second piston half 71 is pushed over the shaft, the assembly being completed by mounting a second ring or washer 83. The complete assembly is pre-tensioned by the aid of a nut or the like (not shown) which may be screwed over threaded part 84 of the shaft, as indicated by arrow 85. The system according to the invention is characterised by its simple and trouble-free assembly, the possibility of producing the required pretension by means of a sprung arrangement, by a good stabilisation achieved by metal inserts, and by additional advantages referred to above.

Figure 6:
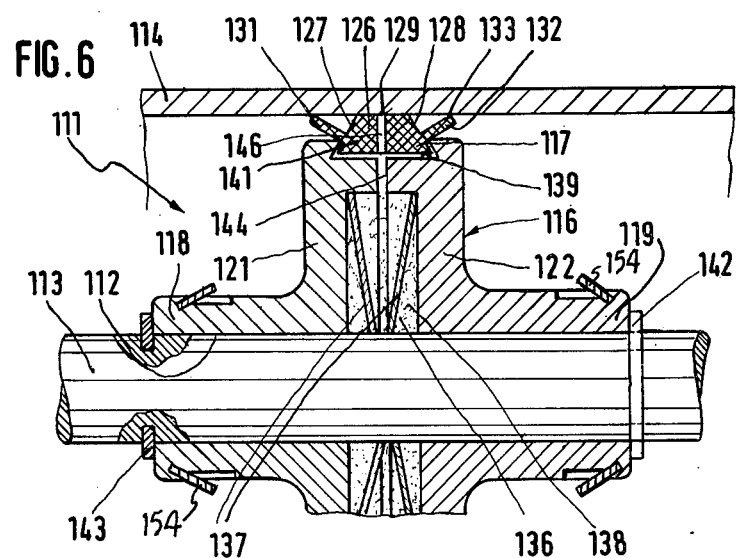
FIG. 6 is an axial section taken through part of a piston for a pneumatic cylinder, according to a sixth embodiment of the present invention.
Figure 7:
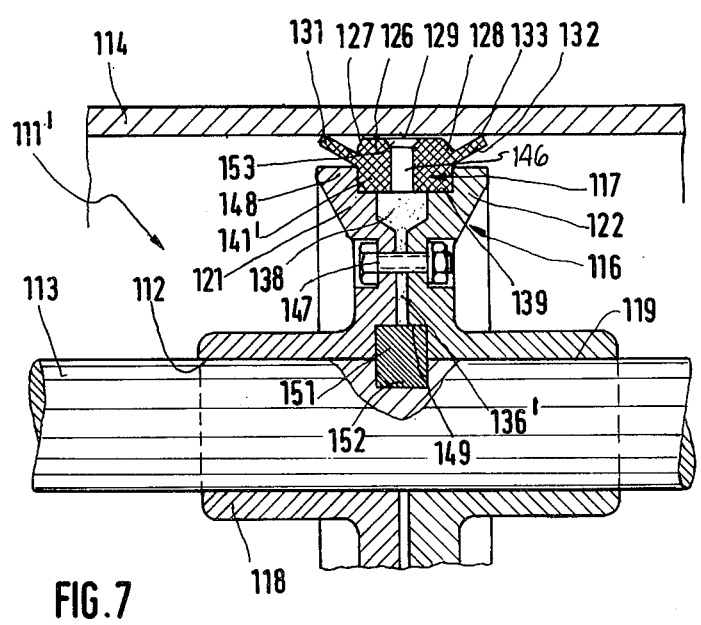
FIG. 7 is an axial section taken through part of a piston according to a seventh embodiment of the present invention.

Rotationally symmetric pistons 111, 111', of which part is shown in FIGS. 6 and 7, each have a central bore 112 for the reception of a piston rod 113, and each piston reciprocates in a corresponding cylinder 114, and constitutes part of a pneumatic unit to which compressed air is admitted from either side. Each piston 111 111' comprises a main piston 116 having a sealing element 117 extending about the circumference thereof and having on either side thereof damper pistons 118 and 119 which constitute an integral part of it. Piston 111, 111' is sectioned in its transverse median plane, i.e., it comprises two identical halves 121 and 122, each half comprising one half of the main piston 116 and formed on damping piston 118 or 119. Again, the damper pistons 118, 119 may differ from the design shown in the drawing, and they may be provided in the region of their free ends with circumferential sealing elements 154 which penetrate at each end of a stroke into corresponding cylinder damping bores (not shown). Needless to say, piston 111, 111' according to the invention may consist exclusively of a main piston, and consequently not incorporate damping pistons. The strength of the material selected for the manufacture of main piston 111, 111' must be such that the compressive loads applied especially by the pressure medium, do not excessively deform the piston and do not make it necessary to use special reinforcing cores. Depending on the expected compressive loads, the preferred materials are aluminum and fibreglass reinforced polyurethane.

The sealing element 117 having an annular shape is provided in both embodiments with a guide ring 126 to which is formed on either side, i.e. at its two end faces 127 and 128 near the circumferential face 129, an elastic sealing lip 131 and 132 which respectively which extend outwardly at angles directed towards the inner wall surface of the cylinder 114. Each of the sealing lips 131, 132, whose free ends lie approximately perpendicular to the sidewalls thereof, is wide enough to ensure that the lip prior to assembly extends at least with its free outer edge 133 beyond the circumferential surface 129 of guide ring 126, which constitutes the sliding area, so that sealing edge 133 will be in sealing contact with the inner surface of the cylinder under the required pretension. The integrally projecting sealing element 177 is made of a plastic material, preferably polyurethane, and is therefore not only sufficiently elastic and supple to enable the sealing lips 131, 132 to form a seal, preferably a compressed air seal, at the internal wall surface of the cylinder but also has a sliding property which is great enough to enable the guide ring 126 to slide under very little friction and possibly without using a lubricant, on the interior wall surface of the cylinder 114. The great width of the circumferential area 129 on the guide ring 126 ensures that the piston movements of 111 and 111' respectively inside the cylinder 114 are perfectly controlled.

Each of the two piston halves 121 and loosely, of the embodiment shown in FIG. 6 includes a central recess, both of which complement each other in the assembled condition, forming a cavity 136 around piston rod 113, and preferably accomodating two juxtaposed plate springs 137 surrounding the piston rod. The cavity 136 may also be filled with a lubricant 138. The main piston 116 is provided on its circumference with a dovetail groove 139 which is evenly divided over the two piston halves 121, 122, and holds the dovetailed internal region 141 of the guide ring 126, preferably loosely, in its position. The method of assembly, and the undisplaceable manner in which the two piston halves 121, 122 are fixed in the axial direction on the piston rod 113, are achieved by the aid of a Seeger ring 142 held in a groove in the piston rod at one end of the piston and by means of a similarly rigid, or screwable, element 143 at the other piston end, which may likewise be a Seeger ring, but also may be a nut screwed on to the piston rod. For assembly, one of the piston halves 122 is first pushed over the piston rod, so that the end face of the damper piston 119 contacts Seeger ring 142, followed by inserting plate springs 137 on the piston rod, and pushing sealing element 117 over one half of main piston 116, after which second half 122 of the main piston is pushed over the piston rod, and secured against axial displacement by the aid of the fixing element. The distance between Seeger ring 142 and element 143, and the form or rather number of plate springs 137 are chosen with a view to ensuring that the two piston halves 121 and 122, which are under the pre-tension of the plate springs 137, retain between a narrow gap 144. This gap 144 opens into lubricant cavity 136 and into radially distributed bores 146 leading to the periphery of guide ring 126. When pressure is applied against one of the two piston halves 121, 122, gap 144 between the two halves, reacting to the elastic connection, is reduced at least during the beginning of a stroke, so that also cavity 136 is correspondingly reduced. This effect corresponds to that of a pump and consequently lubricant 138 may exit cavity 136 through gap 144 and thence through bores 146 between sliding surface 129 of guide ring 126 and the internal wall of cylinder 114. Since inner region 141 of guide ring 126 fits loosely in dovetailed groove 139 of main piston 116, the two piston halves may move relative to each other even in this region.

The two piston halves 121, 122 in the embodiment of the invention shown in FIG. 7 are assembled together by means of lock screw 147 which are equally spaced apart in an annulus of main piston 116. When the two piston halves 121, 122 are assembled together, guide ring 126 whose internal region 141' has parallel edges, is clamped between two annular shoulders 148 which extend around the outer circumference. Moreover a suitable number of square stop members 151 are forced into the recess(es) 149 around the inner circumferential side, which tightly engage with corresponding recesses 152 in piston rod 113. In this manner, piston 111' and piston rod 113 are locked together. Also the two piston halves 121 and 122 incorporate between themselves a cavity 136' which, though narrow, widens towards the outside. This cavity may contain a lubricant 138, and it connects with suitable grease bores 146 in the guide ring 126. These bores 146 open into a wider region 153 opposite the inner cylinder wall, constituting the so-called grease pockets inside the sliding surface 129.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A piston, especially for a pneumatic cylinder, comprising a disc-shaped piston head having a peripheral sliding surface thereon and opposed annular outer end walls, said head comprising two head section halves respectively containing said outer end walls and having a central bore therein lying along a central axis of the piston head, a piston rod extending through said bore, said head having mounted thereon a sealing element with at least one annular sealing lip extending outwardly of said sliding surface, said sealing lip being of elastic and resilient material and being of conical form relative to the central axis, an outer free edge of said lip thereby being capable of sealingly engaging the wall of the cylinder, said section halves having inner end walls respectively opposite said outer end walls, said inner end walls having open annular recesses therein defining a cavity containing a quantity of lubricant, means on said piston rod bearing against said section halves for permitting limited axial movement of said halves relative to said rod, spring means disposed in said recesses for biasing said inner end walls away from one another, and said sealing element having radial passages therein communicating with said cavity, whereby said lubricant is caused to exit said cavity and flow through said passage to the wall of the cylinder as one of said sections axially shifts relative to said rod as pressure is applied against said one section during operation of the piston.

2. The piston according to claim 1, wherein at least one centrally located damper piston extends outwardly of one of said end walls of said piston head, a circumferential sealing element secured to said damper piston, said damper piston having an annular sliding surface, said circumferential sealing element having an annular sealing lip extending outwardly of said annular sliding surface and being of elastic and resilient material.

3. The piston according to claim 1, wherein centrally located damper pistons having annular sliding surfaces extend outwardly of said opposed end walls of said piston head, circumferential sealing elements being secured to said damper pistons, said circumferential sealing elements having annular sealing lips extending outwardly of said annular sliding surfaces and being of elastic and resilient material.

4. The piston according to claim 1, wherein said sealing element has two annular sealing lips extending outwardly of said peripheral sliding surface, said sealing lips being of elastic and resilient material and each being of conical form relative to the central axis of said piston head, outer free edges of said lips thereby being capable of sealingly engaging the wall of the cylinder.

5. The piston according to claim 4, wherein said sealing lips are inclined in opposite directions relative to one another.

6. The piston according to claim 1, wherein said peripheral sliding surface is located on said sealing element.

7. The piston according to claim 1, wherein means are provided connecting said section halves to said rod.

* * * * *